United States Patent [19]

Lewellen

[11] Patent Number: 4,919,081
[45] Date of Patent: Apr. 24, 1990

[54] GARMENT PROTECTOR

[76] Inventor: Jim A. Lewellen, 1017 S. McLean Dr., Santa Ana, Calif. 92704

[21] Appl. No.: 195,860

[22] Filed: May 19, 1988

[51] Int. Cl.⁵ .............................................. A01K 31/12
[52] U.S. Cl. ............................................ 119/26; 2/46
[58] Field of Search ...................... 119/23, 24, 26, 49; 54/37, 44, 2; 2/46, 94, 126, 272

[56] References Cited

U.S. PATENT DOCUMENTS

| | | | |
|---|---|---|---|
| 2,948,899 | 8/1960 | Allen | 2/94 |
| 3,049,719 | 8/1962 | Carmen | 2/125 X |
| 3,106,718 | 10/1963 | Raab | 2/125 X |
| 3,528,108 | 9/1970 | Smith | 2/94 |
| 3,829,901 | 8/1974 | Massetti et al. | 2/272 X |
| 4,411,025 | 10/1983 | Magidson | 2/272 X |
| 4,493,115 | 1/1985 | Maier et al. | 2/2 |
| 4,514,862 | 5/1985 | A'Costa | 2/2 |
| 4,722,099 | 2/1988 | Kratz | 2/115 X |
| 4,807,568 | 2/1989 | Perry et al. | 119/26 |

Primary Examiner—Robert P. Swiatek
Assistant Examiner—Nicholas D. Lucchesi
Attorney, Agent, or Firm—Terry N. Gernstein

[57] ABSTRACT

A protective cover assembly for supporting a bird on a wearer's shoulder in a manner such that the wearer's garments are not soiled by the bird includes a plurality of plys and a bird perch which is sized and shaped to be securely mounted on the wearer's shoulder. The cover can include a drape and arm covers that are releasably attachable to the drape or to the cover and an adjustable neck portion.

13 Claims, 2 Drawing Sheets

GARMENT PROTECTOR

TECHNICAL FIELD OF THE INVENTION

The present invention relates in general to the field of wearing apparel, and relates in particular to apparel which is adapted to protect a wearer's garments. Specifically, the present invention relates to a protective cover which is designed to permit a bird to perch on a person's shoulder.

BACKGROUND ART

Birds have always been popular pets because they are fairly easy to care for, are often tame and friendly and are often quite adaptable to living comfortably in a house.

Because many birds are so friendly, many bird owners would like to have their pet around them as much as possible. To this end, a bird owner often allows the bird to perch on his shoulder or arm as he goes about his house. The bird often responds by playing with the owner and generally keeping the owner company.

However, since birds are not readily trained to relieve themselves only in the proper areas, this comradeship often results in the bird owner's garments being soiled. While somewhat inconvenient, this is especially troublesome if the pet owner likes to wear good clothes that may be expensive to clean, if the soil can be removed at all. Often the soiling leaves a permanent mark on the clothes.

It is noted that merely protecting the person's clothes is not the only consideration in such a garment. The garment must be of the type that is enticing to the bird to encourage the bird to perch on a person.

Thus, while many drapes and the like are available for use in beauty and barber shops and the like, and while there are many cape-like garments suitable for use to protect a wearer against the weather, the present inventor is not aware of any such protective garment which is suitable for use in the context of permitting and encouraging a bird to perch on a person's shoulders or arms while still protecting the clothes of such person from being soiled by the bird.

Still further, those protective garments of the just-mentioned type are intended for use in particular conditions and thus the ease of putting them on or taking them off is not a major factor, nor is the appearance of such garments. However, in the instant situation, the wearer may want to travel or otherwise be seen with the bird, and thus the garment should be adapted for ease of wearing as well as for its compatibility with a wide variety of different style and color clothing. The "beauty shop" type capes and drapes are not suitable for such general use.

OBJECTS OF THE INVENTION

It is a main object of the present invention to provide a protective covering garment that will protect a wearer's clothes from being soiled by a bird resting on the wearer while also encouraging the bird to perch on the wearer.

It is another object of the present invention to provide a protective covering garment that is amenable to a wide variety of situations.

It is another object of the present invention to provide a protective garment that is adaptable for a variety of birds to thereby be adaptable to various situations that may arise in which a particular bird is attracted to one type of garment and is not so attracted to other styles of garment.

It is another object of the present invention to provide a protective garment that can be modified to cover as much of the wearer's body as is necessary in a particular situation.

It is another object of the present invention to provide a protective garment that is adaptable for use with other protective garments.

It is another object of the present invention to provide a protective garment that is easily disassembled for easy cleaning.

It is another object of the present invention to provide a protective garment that is comfortable to wear.

SUMMARY OF THE INVENTION

These and other objects are accomplished by a protective cover having two panels and means for securely attaching a bird perch thereto to be located in the area of the user's shoulder. At least one of the panels is adapted to be fluid-repellant and the other panel is adapted to be easily cleaned, and the panels are releasably attached together.

The bird perch can take a variety of forms depending on the type of bird, and the garment is amenable to changing the perch as necessary whereby the garment can be used with a wide variety of birds, and can also be amenable to a wide variety of uses. The garment also includes means for adapting it to a wide variety of user sizes and needs so that it is amenable to a variety of situations and is comfortable to wear in such wide variety of situations.

Still further, the garment includes a means for releasably attaching arm coverings so that, if desired, the wearer can encourage the bird to sit on his arm.

In this manner, the protective cover of the present invention is amenable to a wide variety of situations and a wide variety of birds and is comfortable to wear and encouraging to the bird thereby permitting the bird's owner and his pet to establish the closeness and companionship so desired by many bird owners while also solving the problems associated with the potential for the owner's clothes becoming soiled due to the presence of a bird on his person.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
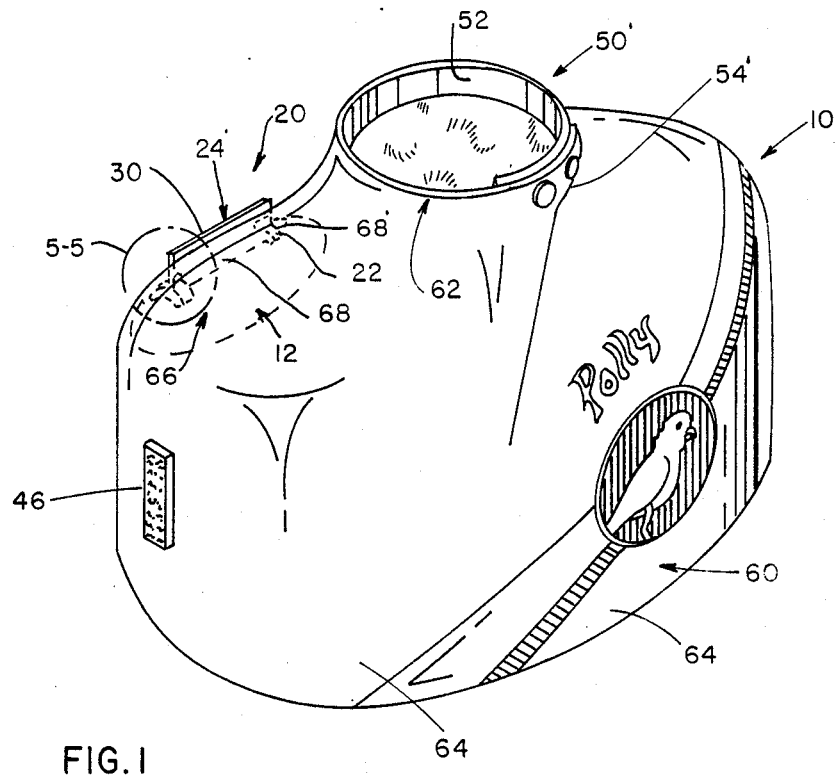
FIG. 1 is a perspective view showing an assembly of protective covers for garments as taught by the present invention.

Referring first to FIG. 1, there is shown a protective cover assembly 10 which includes a shoulder covering portion 12 adapted to cover a wearer's shoulder, preferably posteriorly from inferior to the area of the wearer's scapula over the top of the shoulder anteriorly to the inferior area subadjacent to the user's breast and laterally from adjacent to the user's neck to approximately the area subadjacent to the end of the deltoid muscle. For the sake of convenience, this just-described area will be referred to hereinafter as being the shoulder area.

Figure 2:
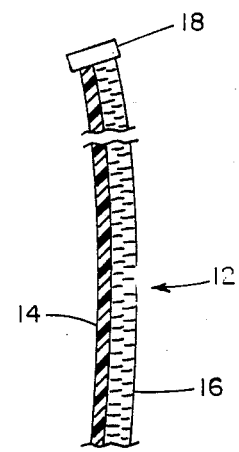
FIG. 2 is a view taken along line 2—2 of FIG. 1 showing the two ply nature of a protective cover.

As indicated in FIG. 2, the covering portion 12 includes a first panel 14 of fluid-repellant or fluid-proof material, such as plastic material, or the like, and is adapted to be located in use immediately next to the wearer. The portion 12 also includes a second panel 16 of fluid-absorbent material, such as cotton, terrycloth, or the like, and is adapted in use to overlie the first panel 14. The panels can be of any shape suitable to properly covering the user's shoulder area, and are shown in FIG. 1 as being roughly rectangular in peripheral shape. The panels are releasably attached together at one edge of the peripheries, by means 18, such as hook and loop fasteners or the like, so that they can be separated as required for proper cleaning. The panels can also have a variety of colors and color combinations as may be suitable for wearing in a wide variety of situations.

Figure 3:
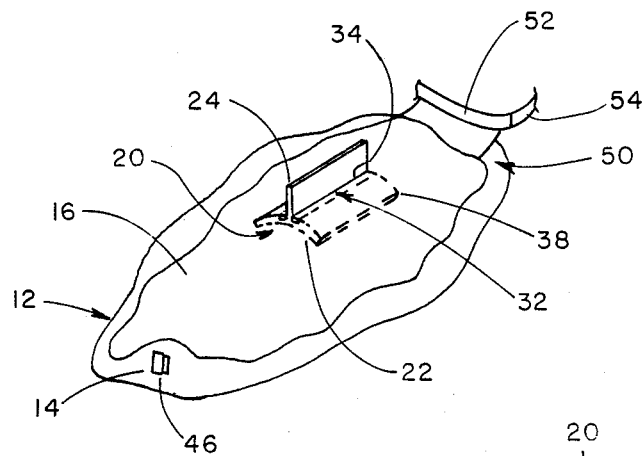
FIG. 3 is a perspective view showing one form of the protective cover embodying the present invention.
Figure 4:
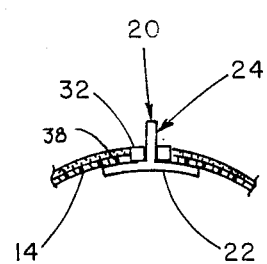
FIG. 4 is an elevation view of the FIG. 3 form of the protective cover.
Figure 5:
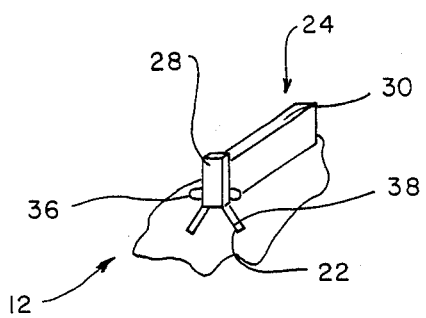
FIG. 5 is a view taken along line 5—5 of FIG. 1 showing one form of the perching means used in carrying out the present invention.

As is indicated in FIGS. 3, 4 and 5, the cover portion 12 includes a bird perching means 20 which includes a base means 22 having an arcuate shape that is sized and adapted to correspond to the shape and size of the wearer's shoulder in the area that the cover portion 12 is to be worn so that the perching means will be securely held in place on the wearer's shoulder in use. If the perching means is not securely held, the bird may not be encouraged to rest quietly on his owner's shoulder thereby tending to somewhat inhibiting the use of the cover 10.

The perching means also includes a platform member 24 on which the bird will sit. The platform member 24 is sized and shaped to orient the topmost portion thereof, on which the bird sits, at a location spaced from the wearer's shoulder and head, yet close enough to the shoulder and head to provide the intimacy desired.

The platform member 24 is shown in FIGS. 3 and 4 as being an element that is monolithic with the base means 22 and which extends in a unitary and unbroken fashion across the entire axial length of the base means 22 as measured from the side thereof adjacent to the user's neck to the side thereof adjacent to the user's arm. The platform member can also be as shown in FIGS. 1 and 5 and indicated by the reference numeral 24' and thus include two projecting column-like members 28 each of which is monolithic with a corresponding base means 22'. The base means 22' are sized and shaped as above discussed to provide a secure support for the perching means while at the same time providing comfort to the wearer. The platform means 24' includes a bar-like cross beam 30 integrally, and preferably monolithically, attached at its ends to the members 28 to be located in the proper position as discussed above.

As is indicated in the aforementioned figures, the cover portion 12 includes a throughpassage 32 which is adapted to accommodate the platform base means. Thus, the base means 24 will require a continuous elongate passage 34 as indicated in FIG. 3; whereas the base means 24' will require two holes, such as hole 36 indicated in FIG. 5. As is also indicated in these figures, the first panel 14 is adapted to overlie top surface 38 of a base means and to thus place the first panel between that top surface and the second panel 16.

Figure 6:
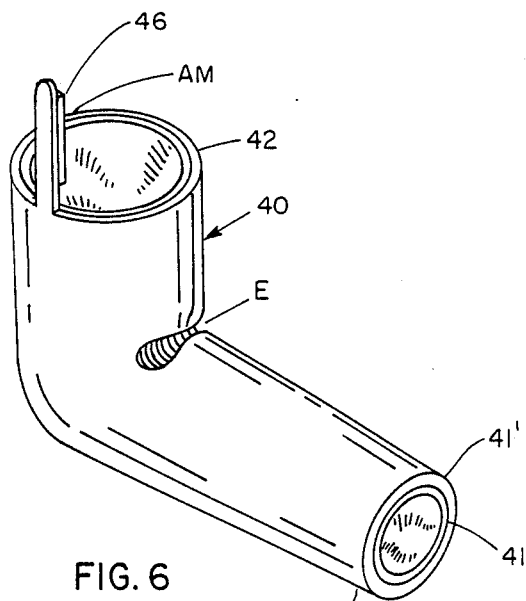
FIG. 6 is a perspective view showing an arm covering attachment suitable for use in the protective cover of the present invention.

As is indicated in FIGS. 3 and 6, the cover assembly portion 12 can also include an arm covering means, such as arm cover 40 that is releasably attached to the cover assembly, such as the portion 12 by suitable attaching means, such as hook and loop fasteners, or the like. The arm cover 40 is preferably two ply and is formed of the same materials as is the rest of the cover so that there is a first ply 41 of fluid-proof material located to lie against the user's arm and a second ply 41' of fluid-absorbent material adapted to overlie the first ply. For ease of movement, the arm cover 40 also includes an opening E that is adapted to lie in the area of the wearer's elbow region to permit easy bending of the arm.

The arm cover 40 includes an attaching means AM having an elongate projection P on the proximal end 42 thereof and which includes a suitable fastening means such as a hook and loop means near the outer end thereof. The distal end 44 of the arm cover 40 can be suitably tapered to provide a snug, comfortable fit. As is indicated in FIG. 3, the arm cover attaching means also includes a fastening means 46 which corresponds to the attaching means AM but which is mounted on the cover assembly, i.e., the cover portion 12 in the embodiment being discussed.

As can be understood from the foregoing, the arm cover 40 is quickly and easily attached and detached from the remainder of the cover assembly via the attaching and fastening means.

If desired, the cover portion 12 can include a means for attaching that portion to a user's neck. This neck-attaching means preferably includes an adjustable neck-encircling portion, such as indicated in FIG. 3 by the reference numeral 50. The portion 50 includes a flange 52 having an adjustable clasping means 54 thereon for securing the portion about the user's neck. The clasping means 54 preferably is of a suitable hook and fastener type.

As is indicated in FIG. 1, the cover assembly 10 can also include a second cover portion 60 which is in the form of a cape-like drape and is adapted to cover the entire chest region of the wearer and to extend anteriorly, posteriorly and laterally as discussed above in relation to the cover portion 12. This drape 60 can be suitably decorated and can be in a variety of colors and color combinations to encourage its wear in a wide variety of situations.

The drape includes a neck portion 62 which is similar to the just-discussed neck portion 50 and thus includes an adjustable neck-encircling portion 50' having a flange 52 in upstanding relation to body 64 of the drape 60 and which has a fastener 52' thereon. The body 64 of the drape is preferably two ply as above discussed to have a first layer which is fluid-repellant and is adapted to lie on the user's garment and a second layer that is fluid-absorbent and is adapted to overlie the first layer.

The drape can also include an attaching and fastening means 46' to which the arm cover is releasably attached as above discussed in regard to the cover portion 12.

The drape will have a suitable perching means accommodating throughpassage 66 defined in the shoulder region thereof whereby the perching means base means passes through the drape as is necessary to carry out the above-discussed function thereof. Thus, in the case of the monolithic base means 24, the throughpassage is an elongate opening 68 as indicated in FIG. 1, or in the case of the base means 24', the throughpassage is a pair of holes, such as hole 68' indicated in FIG. 1.

The perching means passes through the drape in order to orient the perch in the location as discussed above. In such a case, the undersurface of the inner layer of the drape overlies the top surface of the base means in the manner of the cover portion 12 discussed above.

Figure 8:
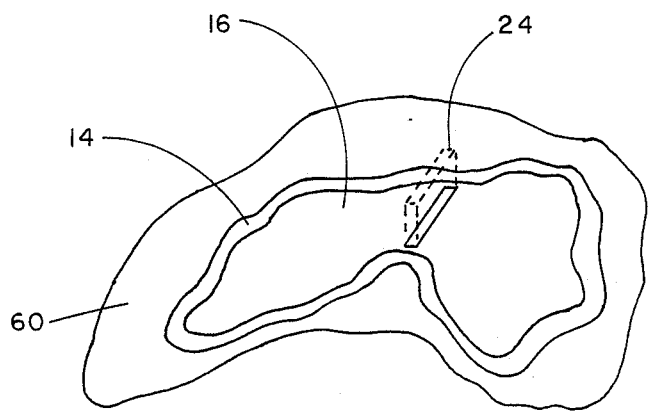
FIG. 8 is a perspective view indicating another form of the cover assembly of the present invention.
Figure 7:
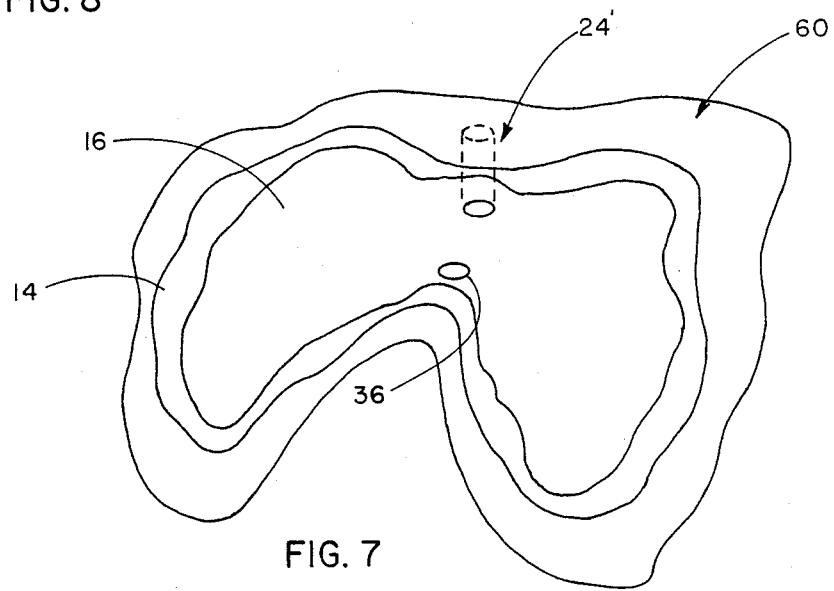
FIG. 7 is a perspective view indicating another form of the protective cover of the present invention.

As is best shown in FIG. 8, if the drape 60 is used in conjunction with the cover portion 12, that cover portion 12 is positioned so that the drape material lies over the perching means base means (with means 24 being indicated in a single dash chain line in FIG. 7 in association with an elongate opening, and means 24' being indicated by a double dash chain line in association with a circular hole in FIG. 8) and the cover portion 12 lies over the outer layer of the drape 60. In this manner, the drape is interleaved between the cover portion and the base means top surface and the first panel 14 of the cover portion is interleaved between the outer surface of the drape and the second panel 16 of the cover portion 12. This permits easy removal of the cover portion for replacement or cleaning. In such a case, the base means is releasably attached to the cover portion as above discussed, and the throughpassage in the drape is adapted to accommodate such an attached cover portion.

It is to be understood that while certain forms of the present invention have been illustrated and described herein, it is not to be limited to the specific forms or arrangement of parts described and shown.

I claim:

1. A protective cover assembly for garments that supports a bird on a wearer's shoulder area comprising:
   a first panel formed of fluid-proof material and adapted to cover the wearer's shoulder area;
   a second panel formed of fluid-absorbent material and adapted in use to overlie said first panel;
   a bird perching means insert securely attached to said first panel for supporting a bird on the wearer's shoulder, said bird perching means including a base means under and being secured to said first panel and being curved in shape to correspond to the curvature of the wearer's shoulder for providing a secure mount, said perching means further including a platform member upon which the bird sits, said platform member being connected to said base means to be positioned to overlie said second panel.

2. The protective cover assembly defined in claim 1 wherein said second panel is separably associated with said first panel.

3. The protective cover assembly defined in claim 2 wherein said first and said second panels are sized to cover the wearer's shoulder area.

4. The protective cover assembly defined in claim 3 further including a neck portion which is defined by a flange attached to said first panel to be in upstanding relation thereto for surrounding the wearer's neck, said flange having an openable fastener means thereon for securing said neck portion about the wearer's neck, said fastener means being adapted to adjust the size of said neck portion according to the size of the wearer's neck.

5. The protective cover assembly defined in claim 4 wherein said fastener includes a hook and loop means.

6. The protective cover assembly defined in claim 5 further including an arm cover which includes a first layer formed of fluid-proof material and a second layer of fluid-absorbent material, and attaching means for releasably attaching said arm cover to said second panel.

7. The protective cover assembly defined in claim 6 wherein said attaching means includes a projecting arm securely mounted on said second layer and hook and loop means mounted on said projecting arm and on said second panel.

8. The protective cover assembly defined in claim 7 wherein said arm cover further includes an arm-bending permitting means located in the area of the wearer's elbow.

9. The protective cover assembly defined in claim 2 further including a cape-like drape adapted to cover the wearer's upper body and having an opening through which said platform means extends so that said platform means overlies said drape.

10. The protective cover assembly defined in claim 9 wherein said first panel and said second panel are connected together to form a connection of said panels, and said drape includes an opening through which the connection of said panels fits.

11. The protective cover assembly defined in claim 10 wherein said drape includes an adjustable opening through which the wearer's neck is received.

12. The protective cover assembly defined in claim 11 further including an arm cover and means for releasably attaching said arm cover to said drape.

13. The protective cover assembly defined in claim 10 wherein said drape includes a plurality of plys with one ply being fluid-absorbent and another ply which is fluid-repellant.

* * * * *